United States Patent
Mattes

(10) Patent No.: US 6,874,349 B2
(45) Date of Patent: Apr. 5, 2005

(54) METHOD AND DEVICE FOR CALIBRATING COMBINATION SENSORS HAVING A RATE-OF-ROTATION SENSOR COMPONENT AND AN ACCELERATION SENSOR COMPONENT

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 10/293,821

(22) Filed: Nov. 13, 2002

(65) Prior Publication Data

US 2003/0126906 A1 Jul. 10, 2003

(30) Foreign Application Priority Data

Nov. 13, 2001 (DE) .......................................... 101 55 667

(51) Int. Cl.⁷ .............................................. G01P 21/00
(52) U.S. Cl. ...................................................... 73/1.37
(58) Field of Search ................................. 73/1.37, 1.38, 73/1.41

(56) References Cited

U.S. PATENT DOCUMENTS

| 4,188,816 A |   | 2/1980 | Mairson |
| 5,712,427 A | * | 1/1998 | Matthews ................ 73/504.04 |
| 6,209,383 B1 | * | 4/2001 | Mueller et al. .............. 73/1.37 |

FOREIGN PATENT DOCUMENTS

| DE | 1 523 149 | 1/1970 |
| DE | 198 58 621 A1 | 7/2000 |
| DE | 198 58 621 C2 | 7/2000 |

* cited by examiner

*Primary Examiner*—Robert Raevis
(74) *Attorney, Agent, or Firm*—Kenyon & kenyon

(57) ABSTRACT

To reduce the outlay needed to calibrate a combination sensor having at least one rate-of-rotation sensor component and at least one acceleration sensor component, the combination sensor is subjected to a defined rotation about its rate-of-rotation sensitivity axis and, in the process, the combination sensor is positioned in such a way that the centrifugal force occurring in response to this rotation acts along its acceleration sensitivity axis.

10 Claims, 1 Drawing Sheet

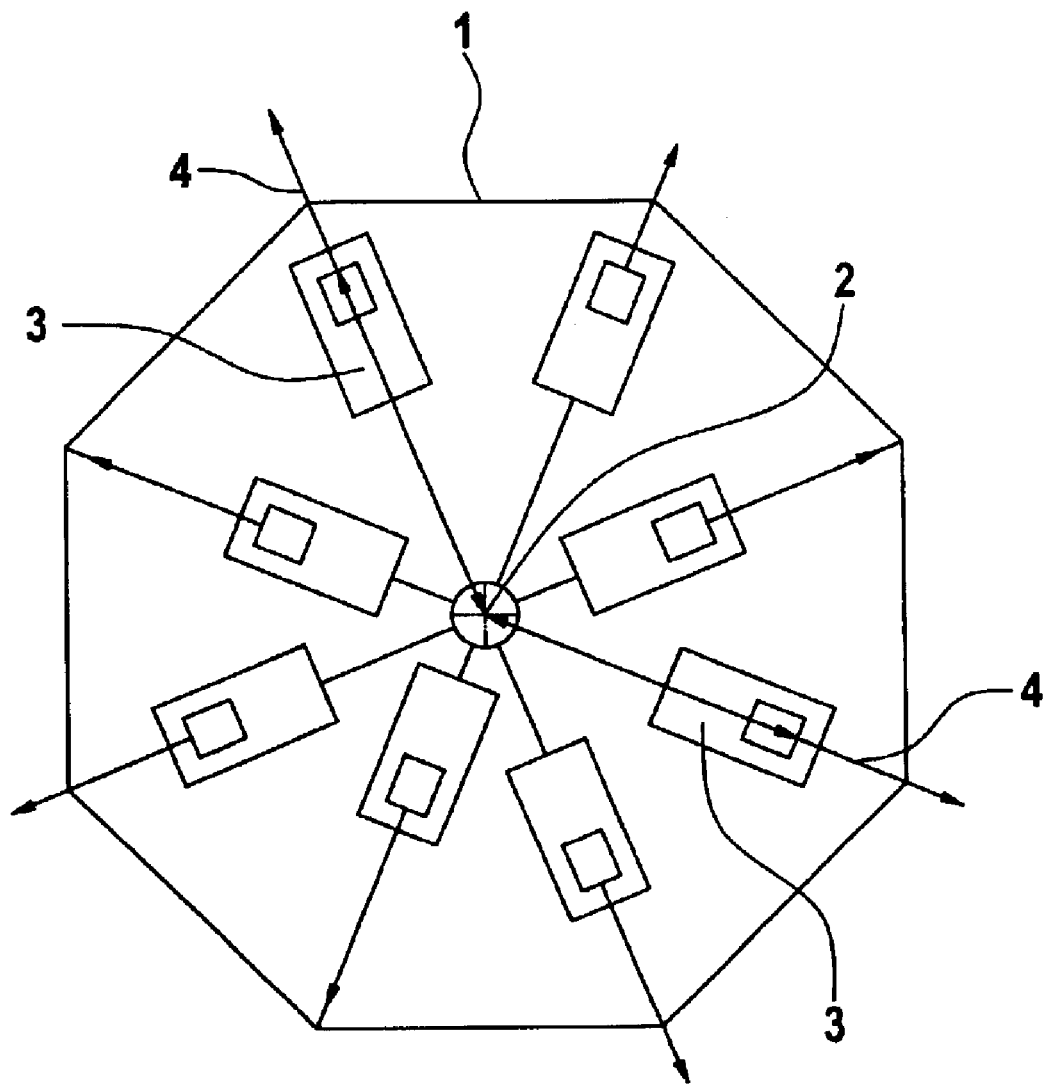

METHOD AND DEVICE FOR CALIBRATING COMBINATION SENSORS HAVING A RATE-OF-ROTATION SENSOR COMPONENT AND AN ACCELERATION SENSOR COMPONENT

FIELD OF THE INVENTION

The present invention is directed to a method for calibrating (adjusting) at least one combination sensor having at least one rate-of-rotation sensor component and at least one acceleration sensor component, so that the combination sensor has at least one rate-of-rotation sensitivity axis and at least one acceleration sensitivity axis. For the calibration, the combination sensor is subjected to a defined rotation about its rate-of-rotation sensitivity axis. The present invention is also directed to a device for implementing such a method.

BACKGROUND INFORMATION

Combination sensors having a rate-of-rotation sensor component and an integrated, statically measuring acceleration sensor component are used, for example, in automotive engineering or technology. The sensitivity and the offset of a rate-of-rotation sensor component are generally checked and calibrated using a device which sets the combination sensor in a rotary motion about its rate-of-rotation sensitivity axis. The sensitivity and offset of the acceleration sensor component are calibrated independently of this at a further calibration station, for example with the aid of a tilting table. Conventionally, each sensor component of the combination sensor is provided with its own calibration station, so that the outlay for calibrating the combination sensor is, on the whole, relatively substantial.

SUMMARY

In accordance with an example embodiment of the present invention, measures are provided which will make it possible to reduce the outlay needed to calibrate a combination sensor.

To that end, the combination sensor is positioned in accordance with the present invention in such a way that the centrifugal force occurring about its rate-of-rotation sensitivity axis in response to a defined rotation, acts along its acceleration sensitivity axis. For this purpose, the device according to the present invention includes, for example, a rotating mechanism supported around its axis of rotation and means for mounting the combination sensor on the rotating mechanism, so that the rate-of-rotation sensitivity axis of the combination sensor is oriented in parallel to the axis of rotation, the acceleration sensitivity axis of the combination sensor is oriented radially with respect to the axis of rotation, and the center of mass of the acceleration sensor component contained in the combination sensor is positioned at a defined distance r from the axis of rotation.

Rate-of-rotation sensors which measure the Coriolis acceleration occurring in response to a rotation and, on this basis, determine the momentary rate of rotation, are only able to be calibrated when they are subjected to a defined rotary motion. A rotary motion also always produces a centrifugal acceleration. According to an example embodiment of the present invention, this acceleration may be used to calibrate the acceleration sensor component of a combination sensor, thereby eliminating the need for a separate calibration station to calibrate the acceleration sensor component, and enabling the calibration of the acceleration component to take place in parallel in order to calibrate the rate-of-rotation sensor component of the combination sensor. In this connection, it may be beneficial to provide that the centrifugal acceleration acting on the combination sensor and, thus, also on its acceleration sensor component is able to be simply determined in the context of a defined rotary motion.

The centrifugal acceleration may be simply determined arithmetically when the center of mass of the acceleration sensor component contained in the combination sensor is positioned at a defined distance r from the axis of rotation. Distance r is defined here as the plumb-line (normal or vertical line) length from the center of mass of the acceleration sensor component contained in the combination sensor, to the axis of rotation. Centrifugal acceleration $a_{zf}$ is then expressed as $$a_{zf} = \omega^2 \cdot r \cdot (\Pi/180)^2 = 3{,}043 \cdot 10^{-4} \cdot \omega^2 \cdot r$$

$\omega$ being the rate of rotation or the angular velocity of the rotary motion (angular motion).

As described above, to calibrate the rate-of-rotation sensor component, the combination sensor may be subjected to a defined rotary motion, i.e., a rotary motion having a defined angular velocity $\omega$. One advantageous variant of the example method according to the present invention provides for angular velocity $\omega$ of the rotary motion to not only be set, but also varied in a defined (determinate) manner, so that the acceleration sensor component is able to be adjusted in response to different accelerations $a_{zf}$. This may be especially useful when the acceleration sensor component exhibits a non-linearity. The offset of the acceleration sensor component may be simply determined at an angular velocity of $\omega=0$, while the sensitivity of the acceleration sensor component is determined at angular velocities of $\omega>0$.

To calibrate its sensor components, the combination sensor may communicate in non-contacting fashion with an evaluation and adjusting unit, for example wirelessly. This makes it possible to avoid contact problems between the rotating sensor and the evaluation and adjusting unit.

Additionally, the ambient temperature of the combination sensor may also be varied in a determinate manner in order to check and adjust the combination sensor's response to temperature changes.

As discussed herein, there are various ways to advantageously embody and further refine the present invention.

BRIEF DESCRIPTION OF THE DRAWINGS

The FIGURE shows a plan view of the rotating mechanism of a device according to an example embodiment of the present invention for calibrating at least one combination sensor which includes a rate-of-rotation sensor component and an acceleration sensor component. In this embodiment, the combination sensor has a rate-of-rotation sensitivity axis and an acceleration sensitivity axis.

DETAILED DESCRIPTION

The rotating mechanism depicted in the single FIGURE is a rotary table 1 which is rotationally mounted about an axis of rotation 2. Besides rotary table 1, the device according to an example embodiment of the present invention includes driving mechanisms (not shown) which enable rotary table 1 to execute a defined rotary motion about axis of rotation 2. In this case, the rotational speed of rotary table 1 and, thus, angular velocity $\omega$ of the rotary motion is not only able to be set, but also varied in a determinate manner.

In this FIGURE, eight combination sensors 3 are mounted on rotary table 1, mounting means, which are not specified in greater detail here, being provided for this purpose. Each of the eight combination sensors 3 is positioned on the rotary table in such a way that its rate-of-rotation sensitivity axis is oriented in parallel to axis of rotation 2. In this manner, along with the rotary motion of rotary table 1, each combination sensor 3 executes a defined rotary motion about its rate-of-rotation sensitivity axis. Moreover, combination sensors 3 are positioned in such a way that their acceleration sensitivity axes 4 are oriented radially with respect to axis of rotation 2. As a result, the centrifugal force occurring in response to the rotary motion of rotary table 1 acts along acceleration sensitivity axes 4 of combination sensors 3.

In the exemplary embodiment illustrated here, the individual combination sensors 3 are positioned at different, but defined distances r from axis of rotation 2, the plumb-line length of the center of mass of an acceleration sensor component contained in combination sensor 3, to axis of rotation 2 being defined as distance r. Because of the different distances r from axis of rotation 2, each combination sensor 3 to be tested, i.e., its position on rotary table 1, is able to be uniquely identified and addressed, so that each individual combination sensor 3 is able to be individually tested and also individually calibrated. It is noted in this connection that a unique allocation between sensor test object and position on the rotary table may also be achieved by implementing the individual addresses of the clamping positions for the sensor test objects and a corresponding protocol in the mounting of the sensor test objects on the rotary table.

For the testing and the calibration of combination sensors 3, an evaluation and adjusting unit (not shown) is provided, with which combination sensors 3 communicate, preferably in a contactless, e.g., wireless manner. The transmitting sections of this evaluation and adjusting unit corotate on the rotary table. Distances r for individual combination sensors 3 are stored in the evaluation and adjusting unit, so that, at a given rate of rotation of rotary plate 1 or angular velocity $\omega$, centrifugal acceleration $a_{zf}$, which acts on individual combination sensors 3, may be individually determined. This is a prerequisite for the calibration of the acceleration sensor component of the combination sensors.

At an angular velocity of $\omega=250°/s$, the following values are derived for centrifugal acceleration $a_{zf}(r)$:

$a_{zf}(0.25\ m)=0.485\ g$
$a_{zf}(0.5\ m)=0.969\ g$
$a_{zf}(1.0\ m)=1.939\ g$

Accelerations of this magnitude are suited as calibration excitations for low-g accelerations sensors having a 2-g measurement range, thus for position or inclination sensors for measuring the gravitational component.

What is claimed is:

1. A method for calibrating a combination sensor having at least one rate-of-rotation sensor component and at least one acceleration sensor component, so that the combination sensor has at least one rate-of-rotation sensitivity axis and at least one acceleration sensitivity axis, comprising:

subjecting the combination sensor to a defined rotation about the rate-of-rotation sensitivity axis; and positioning the combination sensor so that a centrifugal force occurring in response to the rotation acts along the acceleration sensitivity axis.

2. The method according to claim 1, further comprising:

positioning a center of mass of the at least one acceleration sensor component of the combination sensor at a defined distance r from an axis of rotation of the rotation.

3. The method according to claim 1, further comprising:

setting and varying an angular velocity $\omega$ of the rotation in a defined manner.

4. The method according to claim 3, further comprising:

determining a centrifugal acceleration of the combination sensor, an offset of the combination sensor being determined at an angular velocity of $\omega=0$, and a sensitivity of the combination sensor being determined at an angular velocity of $\omega=0$.

5. The method according to claim 1, further comprising:

communicating, by the combination sensor, in non-contacting fashion with an evaluation and adjusting unit to calibrate the at least one rate-of-rotation sensor component and the at least one acceleration sensor component.

6. The method according to claim 1, further comprising:

varying an ambient temperature of the combination sensor in a defined manner.

7. A device for calibrating a combination sensor having at least one rate-of-rotation sensor component and at least one acceleration sensor component, comprising:

a rotating mechanism which is rotationally mounted about an axis of rotation; and an arrangement configured to mount the combination sensor on the rotating mechanism so that a rate-of-rotation sensitivity axis of the combination sensor is oriented in parallel to the axis of rotation, an acceleration sensitivity axis of the combination sensor is oriented radially with respect to the axis of rotation, and a center of mass of the at least one acceleration sensor component of the combination sensor is positioned at a defined distance r from the axis of rotation.

8. The device according to claim 7, further comprising:

an arrangement which adjusts a speed of rotation of the rotating mechanism.

9. The device according to claim 7, further comprising:

an evaluation and adjusting unit, the combination sensor communicating in a contactless manner via the evaluation and adjusting unit.

10. The device according to claim 7, for comprising:

an arrangement configured to vary an ambient temperature of the combination sensor in a defined manner during calibration.

* * * * *